(No Model.)
A. J. DUDLEY.
STEAM COOKING VESSEL.
No. 311,821. Patented Feb. 3, 1885.
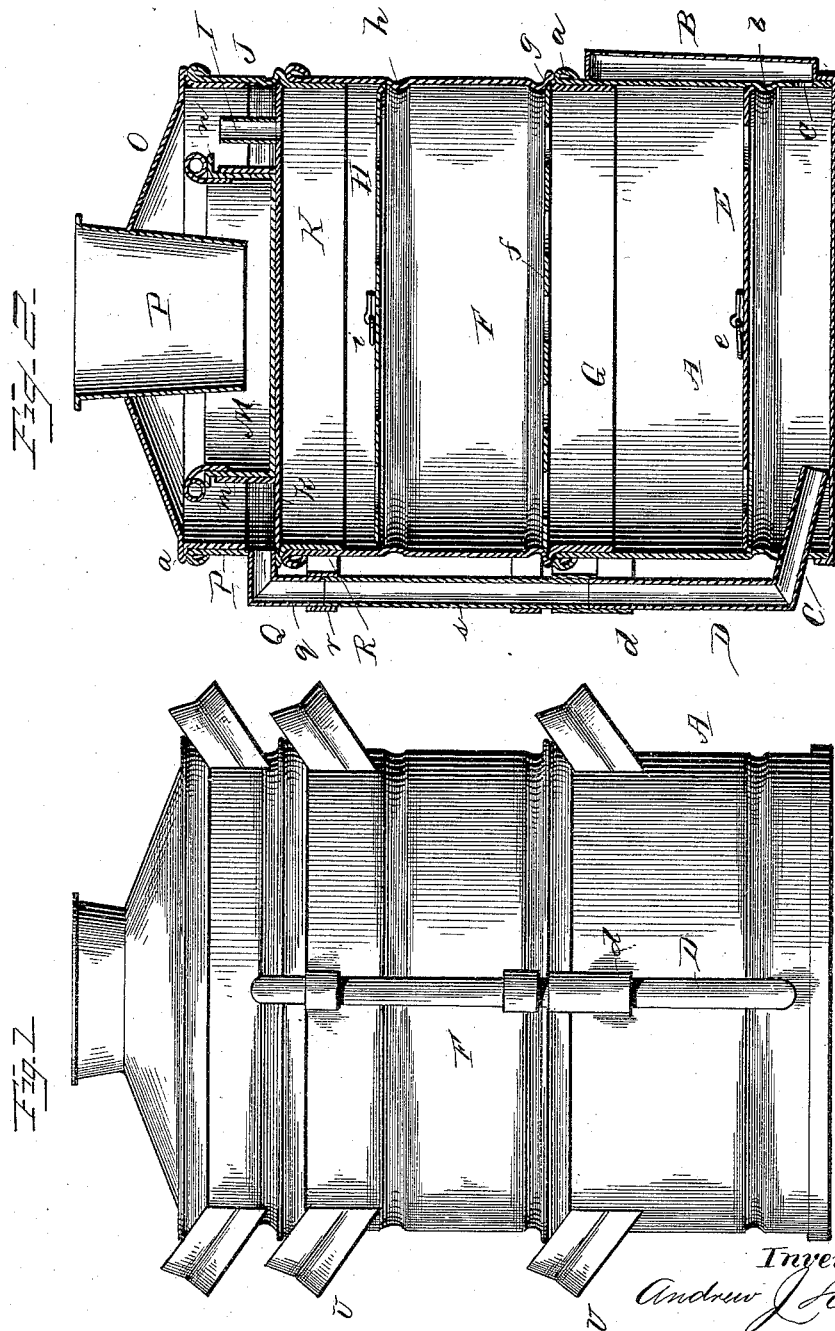

United States Patent Office.

ANDREW J. DUDLEY, OF NORTH ANSON, ASSIGNOR TO BEN MOORE, OF ANSON, MAINE.

STEAM COOKING-VESSEL.

SPECIFICATION forming part of Letters Patent No. 311,821, dated February 3, 1885.

Application filed March 15, 1884. (No model.)

*To all whom it may concern:*

Be it known that I, ANDREW J. DUDLEY, a citizen of the United States of America, residing at North Anson, in the county of Somerset and State of Maine, have invented certain new and useful Improvements in Steam Cooking-Vessels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to steam cooking utensils; and it consists in the improvements hereinafter fully described and set forth.

In the accompanying drawings, forming part of this specification, Figure 1 is a front elevation of a utensil embodying my improvements, and Fig. 2 is a central section of Fig. 1.

A represents a circular receptacle, having an annular bead, $a$, at its top, and grooved to form an annular interior shoulder, $b$. The said receptacle is provided with a perforation, $c$, which communicates with a whistle, B, secured to the side of the receptacle. A pipe, C, horizontally inclined, has one end located near the bottom of the receptacle A, and the said pipe extends through the side of the said receptacle, where it is connected to a vertical section of pipe, D, braced and supported at its top by a loop, $d$, secured to the said receptacle. A perforated partition, E, provided centrally with a pivoted ring-handle, $e$, to facilitate manipulation, is designed to rest peripherally upon the shoulder $b$ and divide the receptacle A into a lower and upper compartment. A second receptacle, F, is provided with a perforated bottom, $f$, which is retained rigidly in position by means of an annular groove, $g$, in which the edge of the bottom rests. The shoulder formed by the formation of the groove $g$ rests upon the bead $a$ of the receptacle A, and supports the receptacle F on said receptacle A, a depending flange, G, of the receptacle F entering the receptacle A and preventing lateral displacement of said receptacle F. The receptacle F is furthermore provided interiorly with an annular shoulder, $h$, adapted to support a perforated partition, H, provided centrally with a ring-handle, $i$, and otherwise similar to the partition E. This partition H divides the receptacle F into an upper and lower compartment. The top edge, $j$, of the receptacle F is beaded, as shown in Fig. 2. A third receptacle, J, has a bottom, $k$, held rigidly in position in the same manner as the bottom $f$ of the receptacle F, the said receptacle J having a depending flange, K, similar to the flange G, which flange rests within the receptacle F, and supports the said receptacle J thereupon. An annular collar, $m$, is secured centrally to the bottom of the receptacle J, and is adapted to receive and retain in position a cup or receptacle, M, having a horizontal flange, $n$, at its upper edge, to bear on the edge of the cup. The receptacle M is provided with handles N at each side. The upper edge of the receptacle M is beaded, to afford a bearing for the shoulder $o$, formed on the cover O to support the same. Flanges $p$ rest inside the receptacle J, and perform an office similar to the flanges G K. The top of the cover O is centrally perforated, to permit a cylinder, P, tapering toward its lower end, to be secured in said top, as shown in Fig. 2. The lower end of said cylinder P extends into the receptacle M beyond the edges of the same. The receptacle J has an opening in its side near the bottom $k$, and from this opening extends an elbow, Q, of pipe, the lower end of the vertical portion $q$ of which rests in a sleeve formed by a loop, $r$, supported by a brace, R, attached to the receptacle F, and connected to a vertical section of pipe, $s$, the lower end of which is secured to a brace, S, also secured to said receptacle F. The lower end of the pipe $s$ fits into the sleeve $d$, and thus establishes an exterior pipe communication between the lower compartment of the receptacle A and the top compartment of the utensil. A pipe, I, extends vertically from an opening in the bottom $k$. Handles V are located on the sides of the respective sections, to aid in handling the same. Water having been placed in the lower compartment of the receptacle A, and the various receptacles with their partitions holding the articles to be cooked or steamed placed in position on the receptacle A, the receptacle M is filled with cold water. The heat vaporizes the water in the receptacle A, and the same passes up through the various perforated partitions until it reaches the compartment beneath the cover O, in which it is subjected to the influence of the water in the receptacle M, and condenses and returns to the lower compartment A by the exterior pipe-connection. As the end of the pipe C within the said receptacle A is near the bottom, of course it is immersed by the water and is sealed against steam passing up said pipe. When the water in said receptacle A falls below the opening c therein, it passes up and sounds the alarm-whistle, thus indicating the amount of water. The water in the receptacle M is always maintained by the contact of the atmosphere to which it is exposed through the cylinder P; but exit of steam is prevented by the seal presented by the lower edge of said cylinder P being immersed in the contents of said cylinder M.

Access may be readily had to any particular compartment by means of the sectional receptacles herein described, which can be lifted one from the other without disturbing their contents.

I am aware of the construction set forth and illustrated in the Patent No. 111,505, granted February 7, 1871, to Agnew, for coffee and tea pots, and I therefore do not claim, broadly, any of the features set forth in the said patent.

I claim—

1. The combination, in a steaming or cooking utensil, of a lower water-chamber, a cold-water receptacle located in the upper part of said utensil, and a pipe connecting the upper part with the lower water-chamber, the latter connection being beneath the low-water line of said chamber, substantially as set forth.

2. The combination, in a steaming or cooking utensil, of a lower water-chamber, a series of perforated partitions located above said chamber, an upper chamber provided with a cold-water receptacle, and a pipe connecting the upper with the lower chamber, the latter connection being beneath the low-water line of said chamber, substantially as set forth.

3. The combination, in a steaming or cooking utensil, of a lower water-chamber, a cold-water receptacle located in the upper part of said utensil, and a pipe for establishing communication between said upper part and lower water-chamber, the latter connection being beneath the low-water line of said chamber, and composed of a series of independent sections retained in position by braces and sleeves, substantially as described.

4. The combination, in a steaming or cooking utensil, of a series of receptacles arranged above each other, having perforated partitions, and forming a lower water-chamber and an upper chamber containing a cold-water receptacle, and a pipe connecting the upper part with the lower water-chamber, the latter connection being beneath the low-water line of said chamber, substantially as described.

5. The combination, in a steaming or cooking utensil, substantially as described, of an upper condensing-chamber containing a cold-water receptacle and a cylinder for exposing said receptacle to the atmosphere, in the manner and for the purpose set forth.

6. The combination, in a steaming or cooking utensil, substantially as described, of an upper condensing-chamber, a lower water-receptacle, a pipe connecting the two, an opening formed at about low-water line in the said lower chamber and communicating with an alarm, and the end of said pipe entering said chamber below said alarm-opening, as set forth.

In testimony whereof I affix my signature in presence of two witnesses.

ANDREW J. DUDLEY.

Witnesses:
ALBERT MOORE,
VIRGIL D. HILTON.